US007347698B2

United States Patent
Dittmann

(10) Patent No.: US 7,347,698 B2
(45) Date of Patent: Mar. 25, 2008

(54) DEEP DRAWN ELECTRICAL CONTACTS AND METHOD FOR MAKING

(75) Inventor: Larry E. Dittmann, Middletown, PA (US)

(73) Assignee: Neoconix, Inc., Sunnyvale, CA (US)

( * ) Notice: Subject to any disclaimer, the term of this patent is extended or adjusted under 35 U.S.C. 154(b) by 0 days.

(21) Appl. No.: 10/892,687

(22) Filed: Jul. 16, 2004

(65) Prior Publication Data

US 2005/0204538 A1    Sep. 22, 2005

Related U.S. Application Data

(60) Provisional application No. 60/554,818, filed on Mar. 19, 2004.

(51) Int. Cl.
*H01R 12/00* (2006.01)
(52) U.S. Cl. .................... 439/66; 439/78; 439/45
(58) Field of Classification Search ............ 439/81–84, 439/66, 71, 78, 45, 873, 876, 843, 857, 847, 439/741, 862
See application file for complete search history.

(56) References Cited

U.S. PATENT DOCUMENTS

| | | | |
|---|---|---|---|
| 3,212,049 A * | 10/1965 | Mittler et al. ................ | 439/45 |
| 3,543,587 A | 12/1970 | Kawada | |
| 3,634,807 A | 1/1972 | Grobe et al. | |
| 3,670,409 A | 6/1972 | Reimer | |
| 4,087,146 A | 5/1978 | Hudson, Jr. | |
| 4,175,810 A | 11/1979 | Holt et al. | |
| 4,548,451 A | 10/1985 | Benarr et al. | |
| 4,592,617 A | 6/1986 | Seidler | |
| 4,657,336 A | 4/1987 | Johnson et al. | |
| 4,893,172 A | 1/1990 | Matsumoto et al. | |
| 4,998,885 A | 3/1991 | Beaman | |
| 5,053,083 A | 10/1991 | Sinton | |
| 5,135,403 A | 8/1992 | Rinaldi | |
| 5,148,266 A | 9/1992 | Khandros et al. | |
| 5,152,695 A | 10/1992 | Grabbe et al. | |
| 5,161,983 A | 11/1992 | Ohno et al. | |
| 5,173,055 A | 12/1992 | Grabbe | |
| 5,199,879 A | 4/1993 | Kohn et al. | |

(Continued)

FOREIGN PATENT DOCUMENTS

EP    0692823    1/1996

(Continued)

OTHER PUBLICATIONS

International Search Report and Written Opinion dated Oct. 18, 2005.

(Continued)

*Primary Examiner*—Tho D. Ta
(74) *Attorney, Agent, or Firm*—D. Curtis Hogue, Jr.; Hogue Intellectual Property

(57) ABSTRACT

A method for making a contact begins by providing a sheet of material. A portion of the sheet is deep drawn to form a cavity having at least one sidewall, the cavity extending away from a rim formed by a non-drawn portion of the sheet. At least one spring member is defined from the at least one sidewall and is bent such that at least a portion of the at least one spring member extends beyond the rim.

8 Claims, 3 Drawing Sheets

U.S. PATENT DOCUMENTS

| | | |
|---|---|---|
| 5,228,861 A | 7/1993 | Grabbe |
| 5,257,950 A | 11/1993 | Lenker et al. |
| 5,292,558 A | 3/1994 | Heller et al. |
| 5,299,939 A | 4/1994 | Walker et al. |
| 5,338,209 A | 8/1994 | Brooks et al. |
| 5,358,411 A | 10/1994 | Mroczkowski et al. |
| 5,366,380 A | 11/1994 | Reymond |
| 5,380,210 A * | 1/1995 | Grabbe et al. ................ 439/66 |
| 5,468,655 A | 11/1995 | Greer |
| 5,483,741 A | 1/1996 | Akram et al. |
| 5,509,814 A | 4/1996 | Mosquera |
| 5,528,456 A | 6/1996 | Takahashi |
| 5,530,288 A | 6/1996 | Stone |
| 5,532,612 A | 7/1996 | Liang |
| 5,575,662 A | 11/1996 | Yamamoto et al. |
| 5,590,460 A | 1/1997 | DiStefano et al. |
| 5,593,903 A | 1/1997 | Beckenbaugh et al. |
| 5,629,837 A | 5/1997 | Barabi et al. |
| 5,632,631 A | 5/1997 | Fjelstad et al. |
| 5,751,556 A | 5/1998 | Butler et al. |
| 5,772,451 A | 6/1998 | Dozier, II et al. |
| 5,791,911 A | 8/1998 | Fasano et al. |
| 5,802,699 A | 9/1998 | Fjelstad et al. |
| 5,812,378 A | 9/1998 | Fjelstad et al. |
| 5,842,273 A | 12/1998 | Schar |
| 5,860,585 A | 1/1999 | Rutledge et al. |
| 5,896,038 A | 4/1999 | Budnaitis et al. |
| 5,903,059 A | 5/1999 | Bertin et al. |
| 5,934,914 A | 8/1999 | Fjelstad et al. |
| 5,956,575 A | 9/1999 | Bertin et al. |
| 5,967,797 A | 10/1999 | Maldonado |
| 5,980,335 A | 11/1999 | Barbieri et al. |
| 5,989,994 A | 11/1999 | Khoury et al. |
| 5,993,247 A | 11/1999 | Kidd |
| 6,000,280 A | 12/1999 | Miller et al. |
| 6,019,611 A | 2/2000 | McHugh et al. |
| 6,029,344 A | 2/2000 | Khandros et al. |
| 6,031,282 A | 2/2000 | Jones et al. |
| 6,032,356 A | 3/2000 | Eldridge et al. |
| 6,042,387 A * | 3/2000 | Jonaidi ................ 439/66 |
| 6,044,548 A | 4/2000 | Distefano et al. |
| 6,063,640 A | 5/2000 | Mizukoshi et al. |
| 6,072,323 A | 6/2000 | Hembree et al. |
| 6,083,837 A | 7/2000 | Millet |
| 6,084,312 A | 7/2000 | Lee |
| 6,133,534 A | 10/2000 | Fukutomi et al. |
| 6,142,789 A | 11/2000 | Nolan et al. |
| 6,146,151 A | 11/2000 | Li |
| 6,156,484 A | 12/2000 | Bassous et al. |
| 6,181,144 B1 | 1/2001 | Hembree et al. |
| 6,184,699 B1 | 2/2001 | Smith et al. |
| 6,191,368 B1 | 2/2001 | Di Stefano et al. |
| 6,196,852 B1 | 3/2001 | Neumann et al. |
| 6,200,143 B1 | 3/2001 | Haba et al. |
| 6,204,065 B1 | 3/2001 | Ochiai |
| 6,205,660 B1 | 3/2001 | Fjelstad et al. |
| 6,208,157 B1 | 3/2001 | Akram et al. |
| 6,218,848 B1 | 4/2001 | Hembree et al. |
| 6,220,869 B1 | 4/2001 | Grant et al. |
| 6,221,750 B1 | 4/2001 | Fjelstad |
| 6,224,392 B1 | 5/2001 | Fasano et al. |
| 6,250,933 B1 | 6/2001 | Khoury et al. |
| 6,255,727 B1 | 7/2001 | Khoury |
| 6,255,736 B1 | 7/2001 | Kaneko |
| 6,263,566 B1 | 7/2001 | Hembree et al. |
| 6,264,477 B1 | 7/2001 | Smith et al. |
| 6,293,806 B1 | 9/2001 | Yu |
| 6,293,808 B1 | 9/2001 | Ochiai |
| 6,297,164 B1 | 10/2001 | Khoury et al. |
| 6,298,552 B1 | 10/2001 | Li |
| 6,300,782 B1 | 10/2001 | Hembree et al. |
| 6,306,752 B1 | 10/2001 | DiStefano et al. |
| 6,335,210 B1 | 1/2002 | Farooq et al. |
| 6,336,269 B1 | 1/2002 | Eldridge et al. |
| 6,337,575 B1 | 1/2002 | Akram |
| 6,352,436 B1 * | 3/2002 | Howard ................ 439/82 |
| 6,361,328 B1 | 3/2002 | Gosselin |
| 6,373,267 B1 | 4/2002 | Hiroi |
| 6,374,487 B1 | 4/2002 | Haba et al. |
| 6,375,474 B1 | 4/2002 | Harper, Jr. et al. |
| 6,384,475 B1 | 5/2002 | Beroz et al. |
| 6,392,524 B1 | 5/2002 | Biegelsen et al. |
| 6,392,534 B1 | 5/2002 | Flick |
| 6,397,460 B1 | 6/2002 | Hembree |
| 6,399,900 B1 | 6/2002 | Khoury et al. |
| 6,402,526 B1 | 6/2002 | Schreiber et al. |
| 6,409,521 B1 | 6/2002 | Rathburn |
| 6,465,748 B2 | 10/2002 | Yamanashi et al. |
| 6,497,581 B2 | 12/2002 | Slocum et al. |
| 6,524,115 B1 | 2/2003 | Gates et al. |
| 6,663,399 B2 | 12/2003 | Ali et al. |
| 6,664,131 B2 | 12/2003 | Jackson |
| 6,669,489 B1 | 12/2003 | Dozier, II et al. |
| 6,671,947 B2 | 1/2004 | Bohr |
| 6,677,245 B2 | 1/2004 | Zhou et al. |
| 6,692,263 B2 | 2/2004 | Villain et al. |
| 6,692,265 B2 | 2/2004 | Kung et al. |
| 6,700,072 B2 | 3/2004 | DiStefano et al. |
| 6,701,612 B2 | 3/2004 | Khandros et al. |
| 6,719,569 B2 | 4/2004 | Ochiai |
| 6,730,134 B2 | 5/2004 | Neidich |
| 6,736,665 B2 | 5/2004 | Zhou et al. |
| 6,750,136 B2 | 6/2004 | Zhou et al. |
| 6,750,551 B1 | 6/2004 | Frutschy et al. |
| 6,763,581 B2 | 7/2004 | Hirai et al. |
| 6,791,171 B2 | 9/2004 | Mok et al. |
| 6,814,584 B2 | 11/2004 | Zaderej |
| 6,814,587 B2 | 11/2004 | Ma |
| 6,815,961 B2 | 11/2004 | Mok et al. |
| 6,821,129 B2 | 11/2004 | Tsuchiya |
| 6,843,659 B2 | 1/2005 | Liao et al. |
| 6,847,101 B2 | 1/2005 | Fjelstad et al. |
| 6,848,173 B2 | 2/2005 | Fjelstad et al. |
| 6,848,929 B2 | 2/2005 | Ma |
| 6,853,210 B1 | 2/2005 | Farnworth et al. |
| 6,857,880 B2 | 2/2005 | Ohtsuki et al. |
| 6,869,290 B2 | 3/2005 | Brown et al. |
| 6,881,070 B2 | 4/2005 | Chiang |
| 6,887,085 B2 | 5/2005 | Hirai |
| 6,916,181 B2 | 7/2005 | Brown et al. |
| 6,920,689 B2 | 7/2005 | Khandros et al. |
| 6,923,656 B2 | 8/2005 | Novotny et al. |
| 6,926,536 B2 | 8/2005 | Ochiai |
| 6,957,963 B2 | 10/2005 | Rathburn |
| 6,960,924 B2 | 11/2005 | Akram |
| 6,976,888 B2 | 12/2005 | Shirai |
| 6,980,017 B1 | 12/2005 | Farnworth et al. |
| 6,995,557 B2 | 2/2006 | Goldfine et al. |
| 6,995,577 B2 | 2/2006 | Farnworth et al. |
| 7,002,362 B2 | 2/2006 | Farnworth et al. |
| 7,009,413 B1 | 3/2006 | Alghouli |
| 7,021,941 B1 | 4/2006 | Chuang et al. |
| 7,025,601 B2 | 4/2006 | Dittmann |
| D521,455 S | 5/2006 | Radza |
| D521,940 S | 5/2006 | Radza |
| 7,048,548 B2 | 5/2006 | Mathieu et al. |
| 7,053,482 B2 | 5/2006 | Cho |
| D522,461 S | 6/2006 | Radza |
| D522,972 S | 6/2006 | Long et al. |
| 7,056,131 B1 | 6/2006 | Williams |
| D524,756 S | 7/2006 | Radza |
| 7,070,419 B2 | 7/2006 | Brown et al. |
| 7,083,425 B2 | 8/2006 | Chong et al. |
| 7,090,503 B2 | 8/2006 | Dittmann |

| | | |
|---|---|---|
| 7,113,408 B2 | 9/2006 | Brown et al. |
| 7,114,961 B2 | 10/2006 | Williams |
| 7,140,883 B2 | 11/2006 | Khandros et al. |
| 7,244,125 B2 | 7/2007 | Brown et al. |
| 2001/0001080 A1 | 5/2001 | Eldridge et al. |
| 2001/0024890 A1* | 9/2001 | Maruyama et al. ........... 439/66 |
| 2002/0011859 A1 | 1/2002 | Smith et al. |
| 2002/0055282 A1 | 5/2002 | Eldridge et al. |
| 2002/0058356 A1 | 5/2002 | Oya |
| 2002/0079120 A1 | 6/2002 | Eskildsen et al. |
| 2002/0117330 A1 | 8/2002 | Eldridge et al. |
| 2002/0129894 A1 | 9/2002 | Liu et al. |
| 2002/0133941 A1 | 9/2002 | Akram et al. |
| 2002/0146919 A1 | 10/2002 | Cohn |
| 2002/0178331 A1 | 11/2002 | Beardsley et al. |
| 2003/0000739 A1 | 1/2003 | Frutschy et al. |
| 2003/0003779 A1 | 1/2003 | Rathburn |
| 2003/0022503 A1 | 1/2003 | Clements et al. |
| 2003/0035277 A1 | 2/2003 | Saputro et al. |
| 2003/0049951 A1 | 3/2003 | Eldridge et al. |
| 2003/0064635 A1 | 4/2003 | Ochiai |
| 2003/0089936 A1 | 5/2003 | McCormack et al. |
| 2003/0092293 A1 | 5/2003 | Ohtsuki et al. |
| 2003/0096512 A1 | 5/2003 | Cornell |
| 2003/0099097 A1 | 5/2003 | Mok et al. |
| 2003/0129866 A1 | 7/2003 | Romano et al. |
| 2003/0147197 A1 | 8/2003 | Uriu et al. |
| 2003/0194832 A1 | 10/2003 | Lopata et al. |
| 2004/0029411 A1 | 2/2004 | Rathburn |
| 2004/0033717 A1 | 2/2004 | Peng |
| 2004/0118603 A1 | 6/2004 | Chambers |
| 2004/0127073 A1 | 7/2004 | Ochiai |
| 2005/0088193 A1 | 4/2005 | Haga |
| 2005/0099193 A1 | 5/2005 | Burgess |
| 2005/0142900 A1 | 6/2005 | Boggs et al. |
| 2005/0167816 A1 | 8/2005 | Khandros et al. |
| 2005/0208788 A1 | 9/2005 | Dittmann |
| 2005/0287828 A1 | 12/2005 | Stone et al. |
| 2006/0028222 A1 | 2/2006 | Farnworth et al. |

FOREIGN PATENT DOCUMENTS

| | | |
|---|---|---|
| EP | 1 005 086 | 5/2000 |
| EP | 1208241 | 1/2003 |
| EP | 0839321 | 1/2006 |
| JP | 200011443 | 4/2000 |
| JP | 2001203435 | 7/2001 |
| WO | WO 9602068 | 1/1996 |
| WO | WO-9743653 A1 | 11/1997 |
| WO | WO 9744859 | 11/1997 |
| WO | WO 0213253 | 2/2002 |
| WO | WO-2005034296 A1 | 4/2005 |
| WO | WO-2005036940 A1 | 4/2005 |
| WO | WO-2005067361 A1 | 7/2005 |

OTHER PUBLICATIONS

Gary B. Kromann et al., "Motorola's PowerPC 603 and PowerPC 604 RISC Microprocessor: the C4/Cermanic-ball-grid Array Interconnect Technology," Motorola Advanced Packaging Technology, Motorola, Inc., 1996, pp. 1-10.

Ravi Mahajan et al., "Emerging Directions for packaging Technologies," Intel Technology Journal, V. 6, Issue 02, May 16, 2002, pp. 62-75.

Williams, John D., "Contact Grid Array System", *Patented Socketing System for the BGA/CSP Technology*, E-tec Interconnect Ltd.,(Jun. 2006), 1-4 Pgs.

* cited by examiner

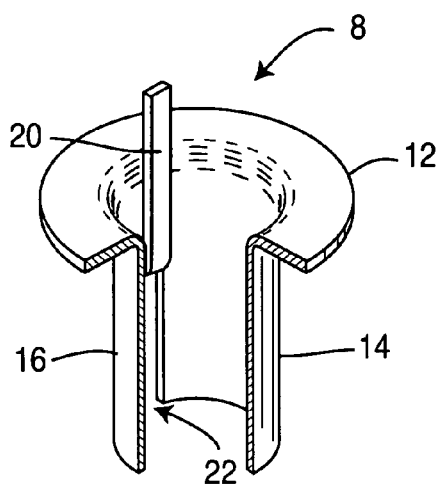
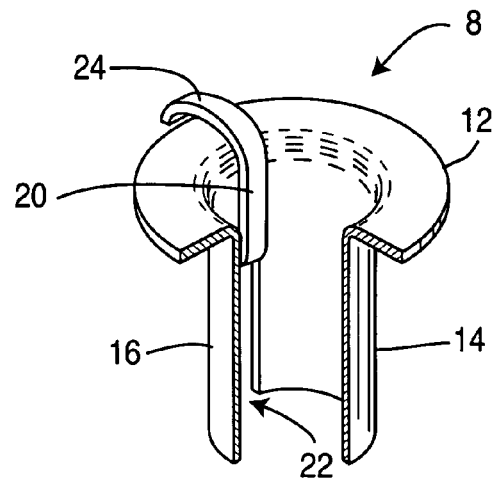
FIG. 5  FIG. 6
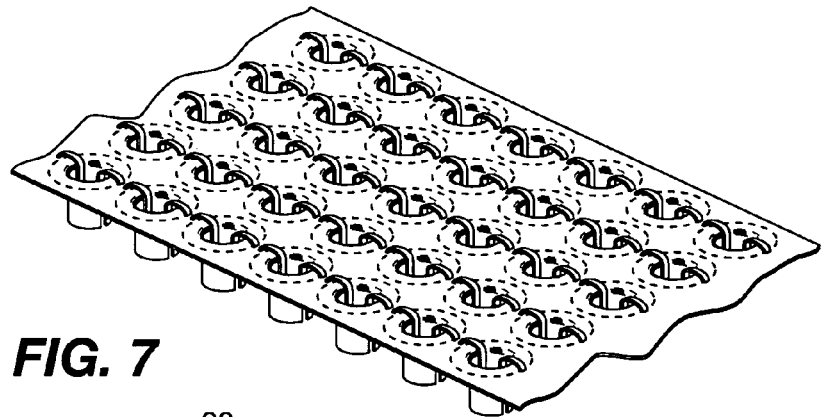
FIG. 7
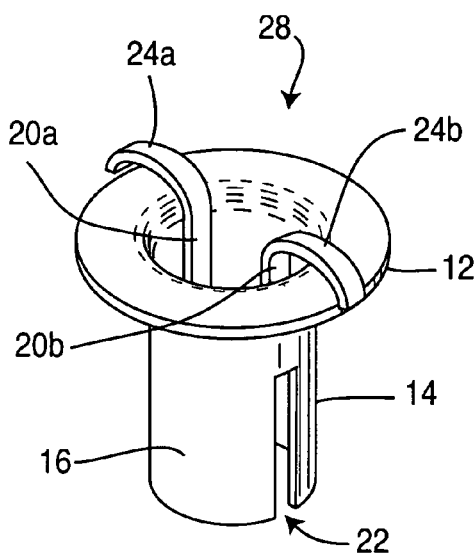
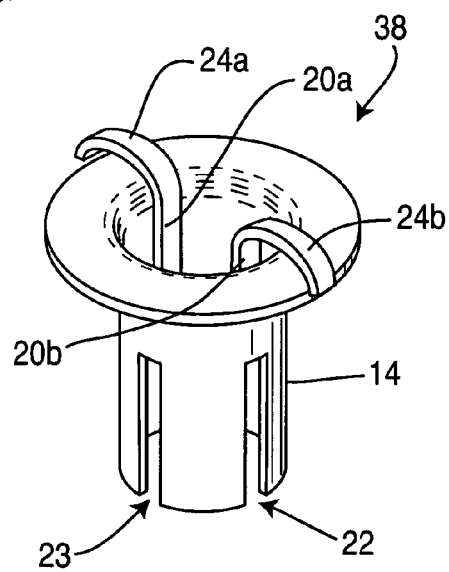
FIG. 8  FIG. 9

DEEP DRAWN ELECTRICAL CONTACTS AND METHOD FOR MAKING

CROSS REFERENCE TO RELATED APPLICATION(S)

This application claims the benefit of U.S. Provisional Application No. 60/554,818, filed on Mar. 19, 2004, which is incorporated by reference as if fully set forth herein.

FIELD OF INVENTION

The present invention is related to electrical contacts. More particularly, the present invention is directed to an eyelet contact which is suitable for use with an interposer, a printed circuit board (PCB), or the like. The present invention also includes a method for making an eyelet contact.

BACKGROUND

There are currently many different types of connector technologies that produce a vast array of connectors for all different types of connector applications. Current connector technologies are deficient in that they are made on a "macro-scale", in which individual pieces of the connector are formed separately and are then integrated together in a final assembled contact. However, such schemes are cumbersome at best, and can result in a defective contact when the integration does not proceed as planned. Further, such schemes do not scale; as the pitch of contacts becomes smaller, the problems associated with current technologies greatly increase. Accordingly, a new technology that avoids the disadvantages with current technologies is desired.

BRIEF DESCRIPTION OF THE DRAWINGS

FIG. 5 is a perspective view of the contact showing the spring member being bent above the rim of the body.

FIG. 6 is a perspective view of the contact showing the forming of the distal end of the spring member.

FIG. 7 is a perspective view of an array of contacts made in accordance with the teachings of the present invention.

FIG. 8 is a perspective view of an alternative embodiment of the present invention including a plurality of spring members.

FIG. 9 is a perspective view of an alternative embodiment of the present invention including additional openings.

DETAILED DESCRIPTION OF THE PREFERRED EMBODIMENTS

Figure 1:
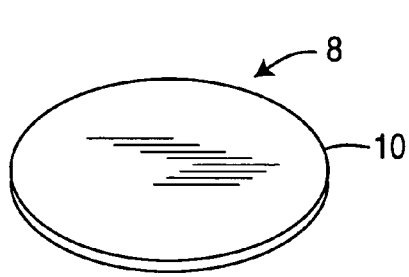
FIG. 1 is a plan view of a sheet of material for making a contact in accordance with the present invention.

The present invention will be described with reference to the drawing figures wherein like numerals represent like elements throughout. The terms "down", "up", "bottom", "side", or "top" as used hereinafter are used only for convenience to differentiate certain aspects of the contact in the orientation shown in the figures. It should be understood that these terms are not meant to limit the functional aspects of the elements to which the terms apply.

The present invention provides an eyelet contact and a method for making the same. The present invention may be utilized with an interposer, on a printed circuit board (PCB), as part of another type of contact, incorporated directly into an electronic device, or may be utilized in a variety of other applications.

Referring to FIG. 1, a sheet 10 of material is shown, which is used to form a contact 8. Preferably, the sheet 10 is formed from a conductive and resilient material such as copper (Cu) or beryllium copper (BeCu), brass, phosphorus bronze, stainless steel, or other types of laminated or non-laminated material. Although the sheet 10 is shown as being configured in a generally circular shape having a certain thickness, those of skill in the art should realize that this is for convenience of explanation and the shape and/or thickness of the sheet 10 will vary depending upon the particular application and the desired physical characteristics of the contact. Such physical characteristics, for example, may include the impedance of the contact, the desired normal force to be applied by the contact, and the working range of the contact. Other characteristics may be related to a variety of plating schemes, or contact schemes such as multiple contact members for higher power application, contact geometry to cradle solder ball technology, or variable heights between contacts in the array for "make first-break last" applications.

Figure 2:
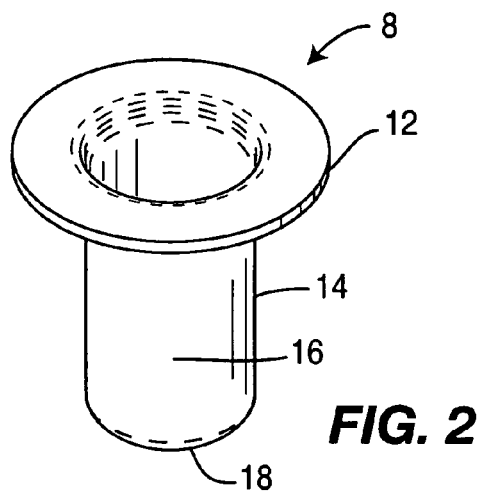
FIG. 2 is a perspective view of the sheet of FIG. 1, which has been deep drawn to form a contact having a lip and a body.

Referring to FIG. 2, the sheet 10 has been deep drawn to form the contact 8 having a cavity, using a deep drawing process, leaving a lip 12 at the top of a deep drawn body 14. Deep drawing is a well-known process to those of skill in the metallurgical arts and, therefore, a detailed description of the process will not be set forth in detail hereinafter. Generally, however, deep drawing selectively stretches a sheet of material to form a desired three-dimensional shape. The cylindrical shape as shown in FIG. 2 and the subsequent figures is for example only and the shape may be any shape desired for the particular application. For example, the body 14 may be substantially rectilinear in shape, or may be drawn deeper or shallower than shown.

The body 14 generally comprises one or more walls 16 and a bottom 18. Although the body 14 shown in the figures is substantially cylindrical and comprises a single continuous wall 16, if the body 14 is a cubic or other three-dimensional shape, there may be a plurality of sidewalls 16. Likewise, although a bottom 18 is shown, a deep drawing process may be used such that there is no bottom 18 to the body 14.

Figure 3:
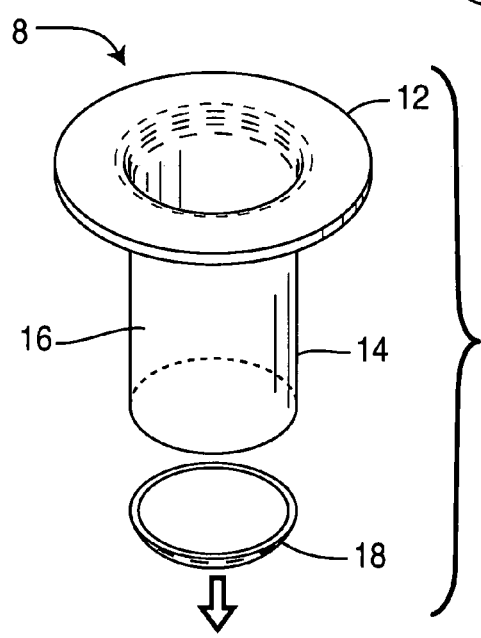
FIG. 3 is a perspective view of the contact of FIG. 2 with the bottom removed.

If the body 14 includes a bottom 18, the bottom 18 may optionally be removed as shown in FIG. 3. This step is preferably used when it is desired to have a contact 8 with an extended operating range. As such, removing the bottom 18 from the body 14 would have certain operational advantages, although this step is optional and is not required for the contact 8 to operate properly.

Figure 4:
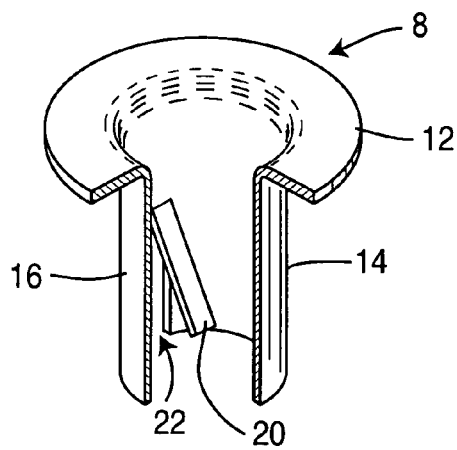
FIG. 4 is a perspective view of the contact and definition of the spring member.

Referring to FIG. 4, two cuts are made in the wall 16 to form a spring member 20 and an opening 22. The spring member 20 is bent away from the wall 16 and then back upon itself and in a generally vertical position extending toward and/or through the top of the body 14 and above the lip 12 as shown in FIG. 5. Although the spring member 20 is shown as extending above the lip 12, this is not required. Accordingly, the spring member 20 may also extend upward toward the opening defined by the lip 12, but still be located below the lip 12.

Referring to FIG. 6, the distal end of the spring member 20 is then bent or otherwise formed in a desired configuration. The desired configuration shown in FIG. 6 is an arch. The distal end of the spring member 20 configured in an arch forms a compliant contact area 24 for mating with a corresponding contact of an electronic device or other device. The corresponding contact may be a generally flat land (such as found on a land grid array (LGA)), a pin, a solder ball (such as found on a ball grid array (BGA)), or any other type of contact system. Although the spring member 20 is shown as bending away from the middle of the contact 8, the spring member 20 may bend toward the center of the contact 8. Additionally, either the entire spring member 20 or the distal end of the spring member 20 may be formed as desired to achieve certain a configuration or specific physical characteristics.

For example, it is possible to form compound springs by having one spring member, when displaced some distance, hit a lower spring member and take advantage of the compound force that results when a first spring member contacts a second spring member, which results in different spring rates.

As a further example, an angular spring member configuration typically urges the point of contact more forcefully into a corresponding flat land, whereas a rounded arch will glide more easily over a land. These configurations each provide distinct wiping performances.

Due to its configuration, the contact 8 shown in FIG. 6 is able to accommodate a wide range of pin connector lengths since the bottom 18 has been removed. A long mating contact, such as a pin, may be inserted into the contact 8 without bottoming out. This provides the ability to mate with different configurations of contacts.

It should be noted that although FIGS. 1-6 were described with reference to forming a single contact, it is envisioned that an array of contacts will be simultaneously formed as shown in FIG. 7. The individual contacts may thereafter be singulated using either mechanical or other known techniques, such as photolithographic mask and etch technology.

Referring to FIG. 8, a contact 28 having two spring members 20a, 20b is shown. Although there is only one spring member 20 shown in FIG. 6 and two spring members 20a, 20b shown in FIG. 8, there may be more spring members as required by the particular application. The spring members 20a, 20b as configured in FIG. 8 include a large gap therebetween, although this is not required. The spring members 20a, 20b are configured with at least one contact area 24a, 24b respectively, as desired in order to properly mate with a corresponding contact.

Although the two spring members 20a, 20b are shown as being substantially similar in length, this is not required. As aforementioned, the particular length and shape of the spring members 20a, 20b may change depending upon the application. In addition, it is possible to have compound spring performance characteristics by having one spring member, for example 20a, with a higher profile and a second spring member 20b with a lower profile. Alternatively, it is possible to provide the contact areas 24a and 24b extending in the same direction, for example, with the first contact area 24a of the first spring member 20a extending over and spaced apart from the second contact area 24b of the second spring member 20b so that the first spring member 20a, when displaced a predetermined distance, hits the second spring member 20b and therefore provides a compound force that results when one spring member contacts another spring member. This provides a different spring rate.

Although not shown, further forming operations may split the spring members 20 into two or more contact areas 24. This would be particularly advantageous in an application where the multiple contact areas 24 can be specifically tailored to the configuration of the corresponding contact. For example, for a solder ball in a BGA, the distal ends may be configured to "cradle" the solder ball.

In an alternate embodiment as shown in FIG. 9, in addition to the opening 22 which is formed as part of making the spring members 20a, 20b, a contact 38 made in accordance with this embodiment of the invention includes additional openings 23 to give the body 14 greater pliancy. This is particularly beneficial in an application in which the contact 38 is inserted into a via (or through hole) in a PCB or other device. The extra pliancy provided by the additional openings 23 may permit the contact 38 to be friction-fitted to a PCB or device without requiring an additional bonding material.

Figure 10:
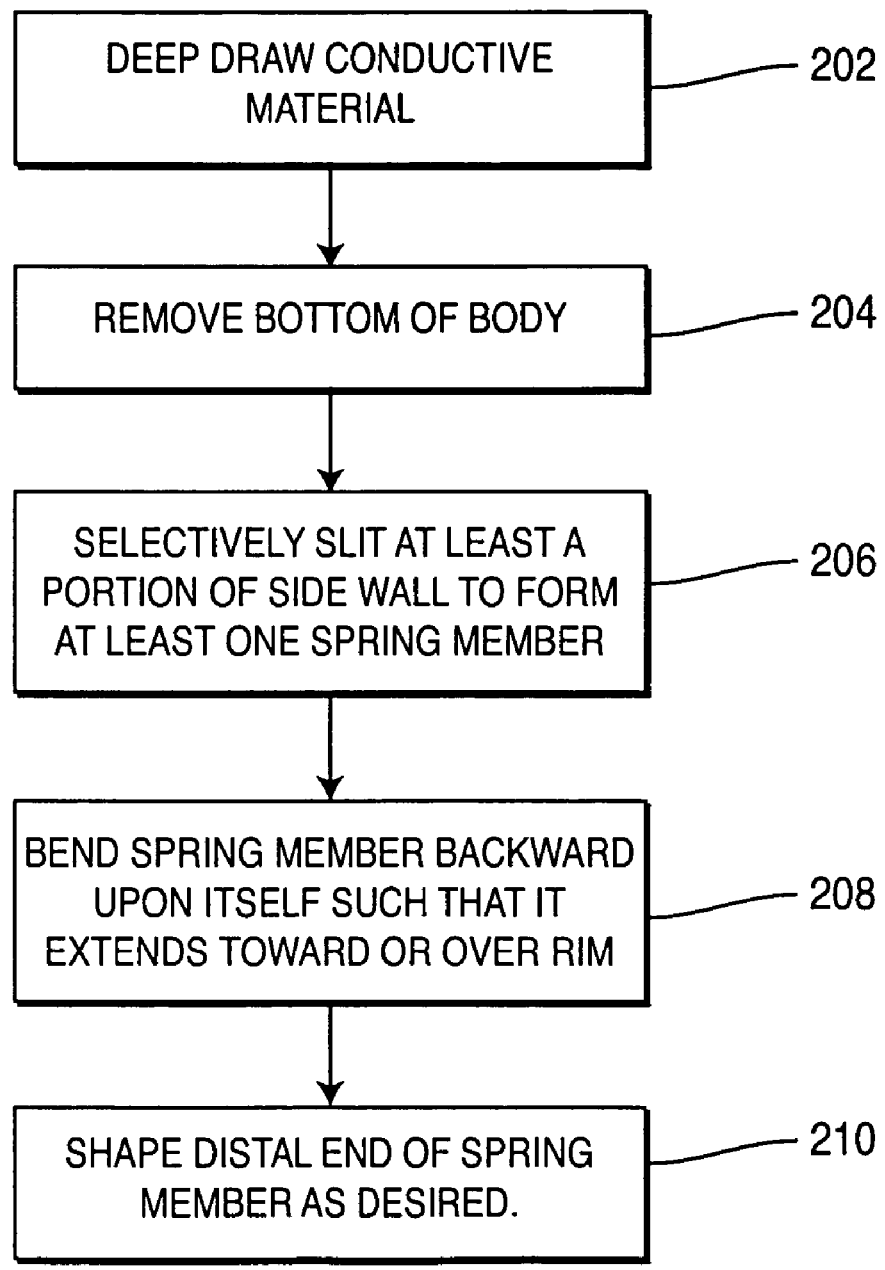
FIG. 10 is a flow diagram of a method of forming a contact in accordance with the present invention.

Referring to FIG. 10, a method 200 for forming a contact in accordance with the present invention is shown. The method 200 begins with deep drawing a conductive material (step 202). The bottom of the body is then removed (step 204), although this step is optional. At least a portion of a sidewall of the body is slit to form at least one spring member (step 206). The spring member is then bent backward upon itself such that the spring member extends toward, or over, the rim of the contact (step 208). The distal end of the spring member is then shaped as desired (step 210).

Although the present invention has been described in detail, it is to be understood that the invention is not limited thereto, and that various changes can be made therein without departing from the scope of the invention, which is defined by the attached claims.

What is claimed is:

1. An electrical contact, comprising:
   a hollow tubular body with a first end and a second end, with at least one linear sidewall;
   a rim formed on either the first end or the second end, the rim extends perpendicularly from the at least one linear sidewall, forming a thickness which is less than the length of the hollow tubular body; and
   at least one spring member formed from the at least one linear sidewall, the at least one spring member is bent such that at least a portion of the at least one spring member extends beyond the end on which the rim is provided.

2. An electrical contact, comprising:
   a hollow tubular body with a first end and a second end, with at least one linear sidewall;
   a rim formed on either the first end or the second end, the rim extends perpendicularly from the at least one linear sidewall, forming a thickness which is less than the length of the hollow tubular body; and
   at least one spring member formed from the at least one linear sidewall, the at least one spring member is bent such that at least a portion of the at least one spring member extends beyond the end on which the rim is provided to form a contact surface.

3. An electrical contact, comprising:
   a hollow tubular body with a first end and a second end, with at least one linear sidewall;
   a rim formed on either the first end or the second end, the rim extends perpendicularly from the at least one linear sidewall, forming a thickness which is less than the length of the hollow tubular body; and at least one spring member formed from the at least one linear sidewall, the at least one spring member is bent such that at least a portion of the at least one spring member extends beyond the end on which the rim is provided to form an arched contact surface.

4. An electrical contact, comprising:

a hollow tubular body with a first end and a second end, with at least one linear sidewall;

a rim formed on either the first end or the second end, the rim extends perpendicularly from the at least one linear sidewall, forming a thickness which is less than the length of the hollow tubular body; and at least one spring member formed from the at least one linear sidewall, the at least one spring member is bent such that at least a portion of the at least one spring member extends beyond the end on which the rim is provided to form an angled contact surface.

5. An electrical contact, comprising:

a hollow tubular body with a top end and a bottom end, with at least one linear sidewall, a portion of the bottom end is removed from the electrical contact;

a rim formed on either the top end or the bottom end, the rim extends perpendicularly from the at least one linear sidewall, forming a thickness which is less than the length of the hollow tubular body; and at least one spring member formed from the at least one linear sidewall, the at least one spring member is bent such that at least a portion of the at least one spring member extends beyond the end on which the rim is provided to form a contact surface.

6. An electrical contact, comprising:

a hollow cylindrical body with a first end and a second end, with at least one linear sidewall;

a rim formed on either the first end or the second end, the rim extends perpendicularly from the at least one linear sidewall, forming a thickness which is less than the length of the hollow cylindrical body; and a spring member formed from the at least one linear sidewall, the spring member is bent such that at least a portion of the spring member extends beyond the end on which the rim is provided to form a contact surface.

7. An electrical contact, comprising:

a hollow tubular body with a first end and a second end, with at least two linear sidewalls;

a rim formed on either the first end or the second end, the rim extends perpendicularly from the at least two linear sidewalls, forming a thickness which is less than the length of the hollow tubular body; and at least one spring member formed from at least one of said linear sidewalls, the at least one spring member is bent such that at least a portion of the at least one spring member extends beyond the end on which the rim is provided to form a contact surface.

8. An electrical contact, comprising:

a hollow tubular body with a first end and a second end, with at least two linear sidewalls;

a rim formed on either the first end or the second end, the rim extends perpendicularly from the at least two linear sidewalls, forming a thickness which is less than the length of the hollow tubular body; and at least two spring members, each of said at least two spring members formed from a corresponding one of said at least two linear sidewalls, said each of the at least two spring members is bent such that at least a portion of each of said at least two spring members extends beyond the end on which the rim is provided to form a contact surface.

* * * * *

UNITED STATES PATENT AND TRADEMARK OFFICE
CERTIFICATE OF CORRECTION

PATENT NO. : 7,347,698 B2  
APPLICATION NO. : 10/892687  
DATED : March 25, 2008  
INVENTOR(S) : Dittmann It is certified that error appears in the above-identified patent and that said Letters Patent is hereby corrected as shown below:

Title Pg, Item (56) "U.S. Patent Documents", in column 2, line 17, below
"6,409,521 B1" insert -- 6,420,661    7/2002    DiStefano et al.
                       6,420,789    7/2002    Tay et al.
                       6,420,884    7/2002    Khoury et al.
                       6,428,328    8/2002    Haba et al.
                       6,436,802    8/2002    Khoury
                       6,437,591    8/2002    Faynworth et al.
                       6,442,039    8/2002    Schreiber
                       6,452,407    9/2002    Khoury et al.
                       6,461,892    10/2002    Beroz --.

On page 2, in field (56), under "U.S. Patent Documents", in column 2, line 18, below
"6,465,748 B2" insert -- 6,472,890    10/2002    Khoury et al.
                       6,474,997    11/2002    Ochiai
                       6,492,251    12/2002    Haba et al. --.

On page 2, in field (56), under "U.S. Patent Documents", in column 2, line 19, below
"6,497,581 B2" insert -- 6,517,362    2/2003    Hirai et al.
                       6,520,778    2/2003    Eldridge et al. --.

UNITED STATES PATENT AND TRADEMARK OFFICE
CERTIFICATE OF CORRECTION

PATENT NO.         : 7,347,698 B2
APPLICATION NO. : 10/892687
DATED              : March 25, 2008
INVENTOR(S)       : Dittmann It is certified that error appears in the above-identified patent and that said Letters Patent is hereby corrected as shown below:

On page 2, in field (56), under "U.S. Patent Documents", in column 2, line 20, below "6,524,115 B1" insert -- 6,551,112    4/2003   Li et al.
    6,576,485    6/2003   Zhou et al.
    6,604,950    8/2003   Maldonado et al.
    6,612,861    9/2003   Khoury et al.
    6,616,966    9/2003   Mathieu et al.
    6,622,380    9/2003   Grigg
    6,627,092    9/2003   Clements et al.
    6,640,432   11/2003  Mathieu et al.
    6,661,247   12/2003  Maruyama et al. --.

Signed and Sealed this

Nineteenth Day of May, 2009

JOHN DOLL
*Acting Director of the United States Patent and Trademark Office*